Dec. 13, 1955  M. FARBER  2,726,809
MOMENTS OF DISTRIBUTION DETERMINING DEVICE
Filed Sept. 11, 1951  3 Sheets-Sheet 1

INVENTOR.
MONROE FARBER.
BY
J. Jordan Hunik
ATTORNEY.

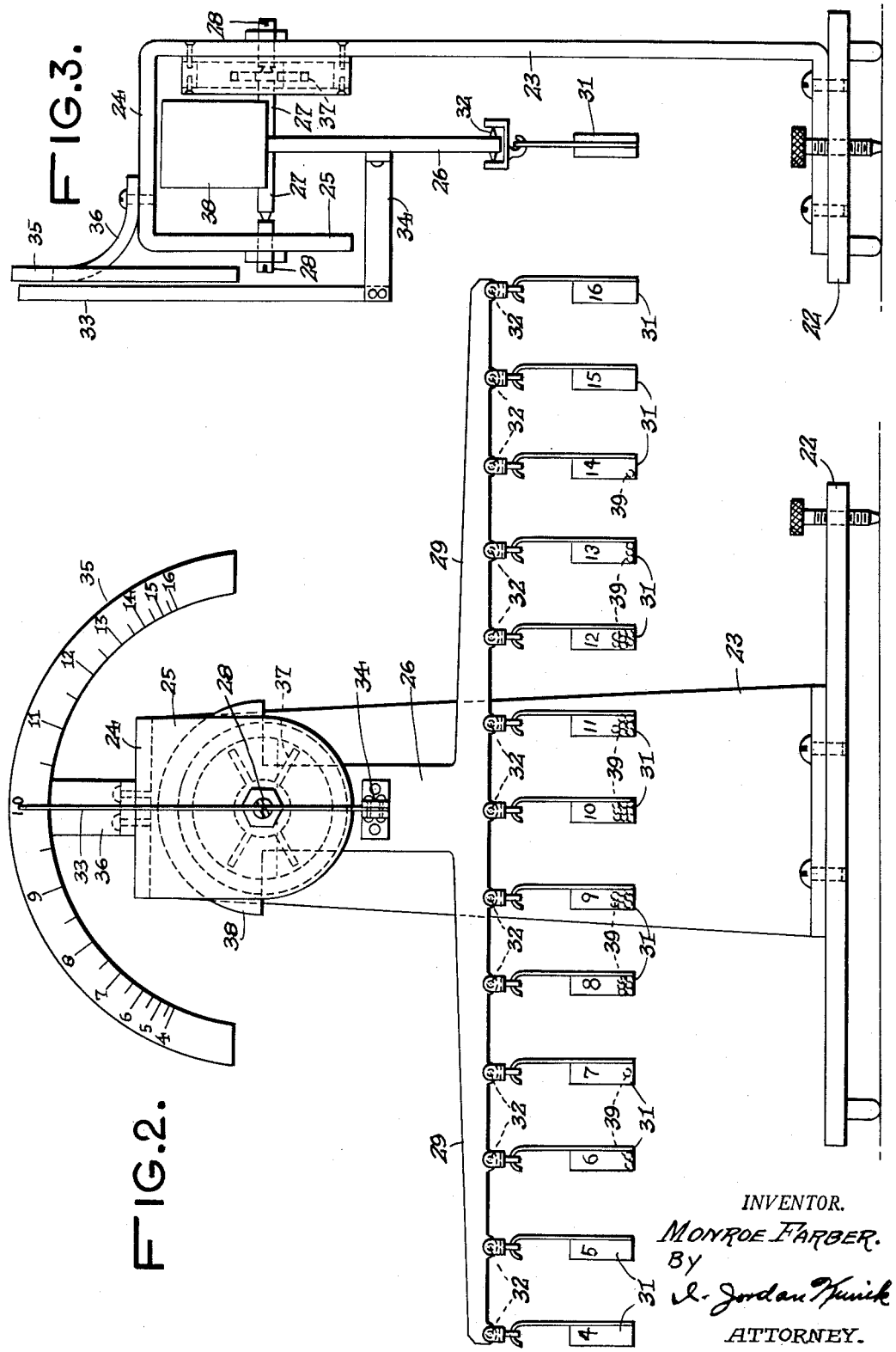

Dec. 13, 1955   M. FARBER   2,726,809
MOMENTS OF DISTRIBUTION DETERMINING DEVICE
Filed Sept. 11, 1951   3 Sheets-Sheet 3

INVENTOR.
MONROE FARBER.
BY
J. Jordan Funik
ATTORNEY.

2,726,809

MOMENTS OF DISTRIBUTION DETERMINING DEVICE

Monroe Farber, Woodside, N. Y.

Application September 11, 1951, Serial No. 246,000

1 Claim. (Cl. 235—61)

This invention relates to apparatus for determining moments of histogram type distributions and particularly to instruments for automatically and continuously determining moments of statistical distributions.

One of the objects of the invention is to provide such instruments for indicating directly on a suitably graduated scale the moment of a distribution with but one simple balancing operation and without resort to the usually arduous mathematical calculations.

Another object of this invention is to provide, for purposes of further automatic computation, a mechanical motion according to a simple function of the moment of distribution with but one simple balancing operation for each value added to the distribution and without resort to mathematical calculations.

One means of obtaining these objects is to provide a movable beam carrying a number of weight pans with their pivots aligned along a straight line, said beam being fulcrumed substantially at the center of gravity of the movable part of the system. The fulcrum is positioned at some distance from the line along which the weight pans are suspended. A number of masses equal in magnitude are available for placing in at least one of said pans. A relatively long pointer is fixed to the movable system and moves over a suitable scale graduated in numerical values indicating directly the moment as indicated in the illustrated embodiments.

Various other objects and advantages of the invention will be understood from the following description taken in connection with the accompanying drawings, in which:

Figure 2 is a schematic front elevation of an instrument disclosing one embodiment of my invention.

Figure 3 is an end elevation of the device shown in Figure 2.

Figure 1:
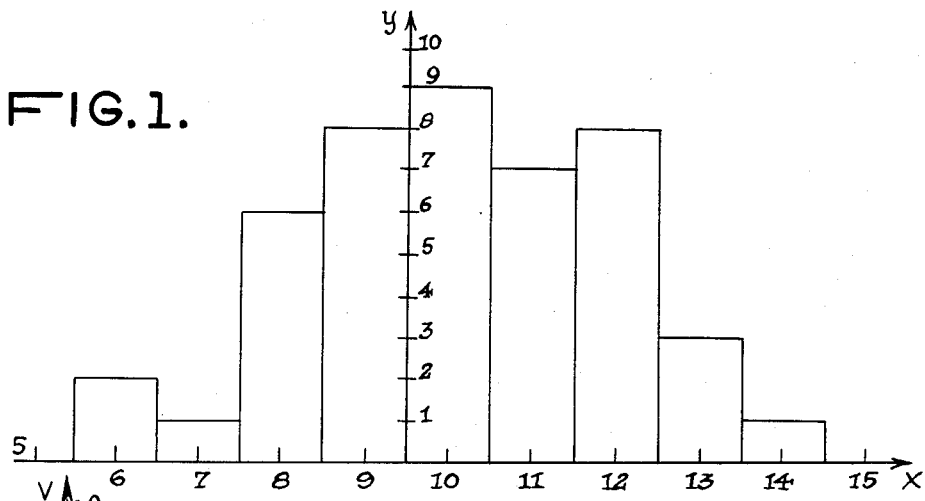
Figure 1 is a typical histogram.

In Figure 1 there is shown a representative histogram such as is commonly used in statistical work to give a pictorial description of a statistical distribution. In such a diagram the ordinate, or the vertical axis represents the frequency of occurrence within a particular subdivision of the values represented by the abscissa, or the horizontal axis.

The histogram is used to approximate the probability of occurrence of a value. For example, suppose forty-five measurements were made. Of these, two were between 5½ and 6½ in value, one was between 6½ and 7½, six were between 7½ and 8½, eight were between 8½ and 9½, etc. Then the probability that another measurement from the same lot would fall between 5½ and 6½ is about 2/45; between 6½ and 7½, 1/45; between 7½ and 8½, 6/45; etc. One use of the moments is to test the validity of theoretical probability curves with empirical data which are used in making such a histogram.

The moment of a distribution is defined mathematically as:

$$M_k' = \frac{\sum_{j=1}^{s} x_j^k}{s}$$

where $M_k'$ is the moment per unit frequency of order $k$, $k$ being a preselected constant, $s$ is the total number of values, $j$ is the identity of the individual values given, $x$ is the algebraic quantity of any value and hence $x_j$ is a particular value. $\Sigma$ is the usual summation symbol. In other words, for a set of values of a distribution the moment of that distribution shall be defined as the sum of all those values, each taken to the proper power, and the sum being divided by the total number of values in that set. The moment will be defined to be of an order corresponding to the power to which the values are taken.

In order to be practical, $x$ is divided into subdivisions so that $x_j$ becomes the center of a subdivision. The definition can then be given as:

$$M_k' = \frac{\sum_{j=1}^{n} f_j x_j^k}{\sum_{j=1}^{n} f_j}$$

where $j$ now becomes the identity of the individual subdivisions of $x$, $n$ is the number of subdivisions and $f_j$ is the frequency of occurrence of values of $x$ within the subdivision whose center is $x_j$. This definition applies to histogram distributions as can be seen by reference to Fig. 1 where a moment is taken about some particular ordinate. Using the values of Fig. 1:

$$M_k' = \frac{2x6^k + 1x7^k + 6x8^k + 8x9^k + 9x10^k + 7x11^k + 8x12^k + 3x13^k + 1x14}{2+1+6+8+9+7+8+3+1}$$

This is a moment about the ordinate at $x=0$.

Very often it is more convenient to take the moments about some ordinate other than $x=0$. The definition of the moment is then revised to the following:

$$M_k' = \frac{\sum_{j=1}^{n} f_j (x_j - x_0)^k}{\sum_{j=1}^{n} f_j}$$

where $x_0$ is the value of $x$ around whose ordinate the moment is taken.

It would be more convenient in the foregoing example to take the moment about the ordinate at $x=10$; therefore, $$M_k' = \frac{2(-4)^k + 1(-3)^k + 6(-2)^k + 8(-1)^k + 9x0 + 7x1^k + 8x2^k + 3x3^k + 1x4^k}{2+1+6+8+9+7+8+3+1}$$

For a moment of the first order, that is $k=1$, the mean value of the distribution is obtained:

$$M_1' = \frac{-8-3-12-8+0+7+16+9+4}{45} = \frac{5}{45} = \frac{1}{9}$$

Therefore, the mean value is at $x=10\tfrac{1}{9}$.

It can be seen from the foregoing comparatively simple example that such computations for a definite given number of values are arduous and time-consuming. It is also evident that for each new value to be added to the aggregate of previous values whose moment is already solved for, the calculation must be repeated in its entirety for each new aggregate of values. Thus, where initially 45 values were postulated as an example, a complete new calculation must be made if one value, a 46th, is added.

When, for instance, measurements are required to be made in a context where new values are continuously added to a growing aggregate of which at least one characteristic is progressively to be determined, the number of calculations increases accordingly. When higher order moments are involved the calculations become even more complex.

The moments of higher order are usually taken about the mean value, such moments being denoted by dropping the prime superscript. These higher order moments are then defined by the following relationship:

$$M_k = \frac{\sum_{j=1}^{n} f_i(x_i - M_1')^k}{\sum_{j=1}^{n} f_i}$$

Then expanding the numerator according to the binomial theorem, the moments with respect to the mean can be found in terms of the moments taken around an arbitrary ordinate. For example, suppose $k=2$, then $$M_2 = M'_2 - (M'_1)^2$$

Although this last step is relatively simple to perform, it must be repeated in addition to the calculation of the primed moments, which in themselves were seen to represent large amounts of calculations. For instance, to solve for $M_2$ it is first necessary to calculate $M_1'$, next to calculate $M_2'$, and then from the formula $M_2$ can be derived.

The present invention provides novel instrumentation which performs the major portion of the foregoing calculations to arrive at the desired moments of a distribution referred to some convenient ordinate of the histogram type distribution. The same basic structure, it will be seen, can be designed to obtain not only the first moment but higher integral order moments, and if needed, even fractional and decimal order moments. As all these moments are taken about some arbitrarily convenient value, the adaptation of higher moments to a reference around a mean or first order moment which was indicated as being useful, may readily be accomplished by the addition or connection of auxiliary computers to the principal instruments.

The instruments to be described herein are designed for the purpose of solving for the first moment and second moment, respectively, but it is understood that higher order or fractional and decimal order moments can be arrived at by designing similar instruments in accordance with the principles set forth herein.

The instrument illustrated in Figs. 2 and 3 is a first moment or mean analogue computer having a frame consisting of a broad and preferably heavy base plate 22 to which is fixed a support formed of an upright 23, the upper end of which is bent forwardly to form a bracket 24 for carrying the depending supporting face plate 25. The support structure carries a self-balancing system which includes an arm 26 pivotally mounted between the upright 23 and the face plate 25 and free to rotate in a vertical plane.

Arm 26 is mounted on a pivot pin 27 journaled in end bearings 28 threaded through the upright 23 and face plate 25. Pivot pin 27 serves as the fulcrum and passes substantially through the center of gravity of the movable system. To the arm 26 is attached a beam 29 extending on both opposite sides of the arm. Weight pans 31, which may be made in the shape of tubes closed at the bottom, are swingingly supported on pivots 32 on the beam and are arranged along a straight line perpendicular to arm 26.

Pivots 32 are positioned in a straight line on beam 29 and are arranged on either side of a perpendicular line connecting fulcrum 0 with said line of pivots.

Pivots 32 are distributed according to the formula $K(x_j - x_0)$, where $x_0$ is the value of $x$ around whose ordinate the moment is to be taken, $x_j$ is the value which is to be represented by a particular pivot, and K is the scaling factor to convert whatever units $x$ might be into units of linear distance along the beam. The pivots or weight tubes are marked with the values of $x_j$. For example, the weight pan 31, labeled "10" corresponds to the value $x_j = x_0$. Weight pan 31, labeled "13," corresponds to the value $x_j = x_{+3}$. Weight pan 31, labeled "6" corresponds to the value $x_j = x_{-4}$. Comparable relative positions and values are assigned to the other pans 31.

A pointer 33 held by bracket 34 attached to arm 26, extends radially from the fulcrum to indicate the angle of movement of the system, both pointer and bracket forming an element of the balancing system. The extreme end of the pointer is arranged to move over a suitably curved scale 35 which is disposed on both sides of the vertical line passing through the fulcrum. Scale 35 is supported by bracket 36 attached to bracket 24. The pointer is relatively long in order that the scale may be spread over a sufficiently long run and is preferably in the form of a thin blade so that the scale may be read accurately without parallax.

The scale is graduated to read the moment directly and the graduations are spaced according to the angle determined by the formula, $$\text{Arctangent}\left(\frac{K}{L} M_1'\right)$$

where L is the perpendicular distance from the line of the pivots 32 to the fulcrum, the graduation corresponding to a zero value for $M_1'$ being placed on the vertical line through the fulcrum.

A damper 37 is carried by pivot pin 27 to provide viscous damping of the movable system to reduce the oscillations caused by the addition of weights.

A counterbalancing weight 38 is affixed to arm 26 on the side of arm 26 opposite the beam to raise the center of gravity of the movable system into coincidence with the axis of rotation.

A plurality of small balls 39 of equal mass are supplied as an element of the computer. These balls are placed in the weight tubes 31 to represent, by analogy, the distribution whose moment is to be determined.

In operation the instrument is placed on a firm support and set by leveling the base until the pointer is exactly vertical if a ball is placed into the weight pan 31 at $x_j = x_0$, said weight pan in this illustrative example being labeled "10" and being positioned directly below the fulcrum 0. Then the ball is removed.

If the total distribution is known in advance, a number of balls agreeing exactly with the number of times a value is repeated are placed in the pan marked with that value. When all the pans have their proper number of balls, the moment is read directly at the position of the pointer on the scale.

If the distribution is not known in advance, the computer can be used to obtain the moment as each value is added to the distribution. Every time a value is obtained, a ball is placed in the pan representing that value. The computer then not only indicates the moment of all values obtained continuously, but keeps track of the distribution so that if another moment is desired it is only necessary to lift off the pans and place them appropriately on a similar computer properly scaled for that other moment.

Figure 4:
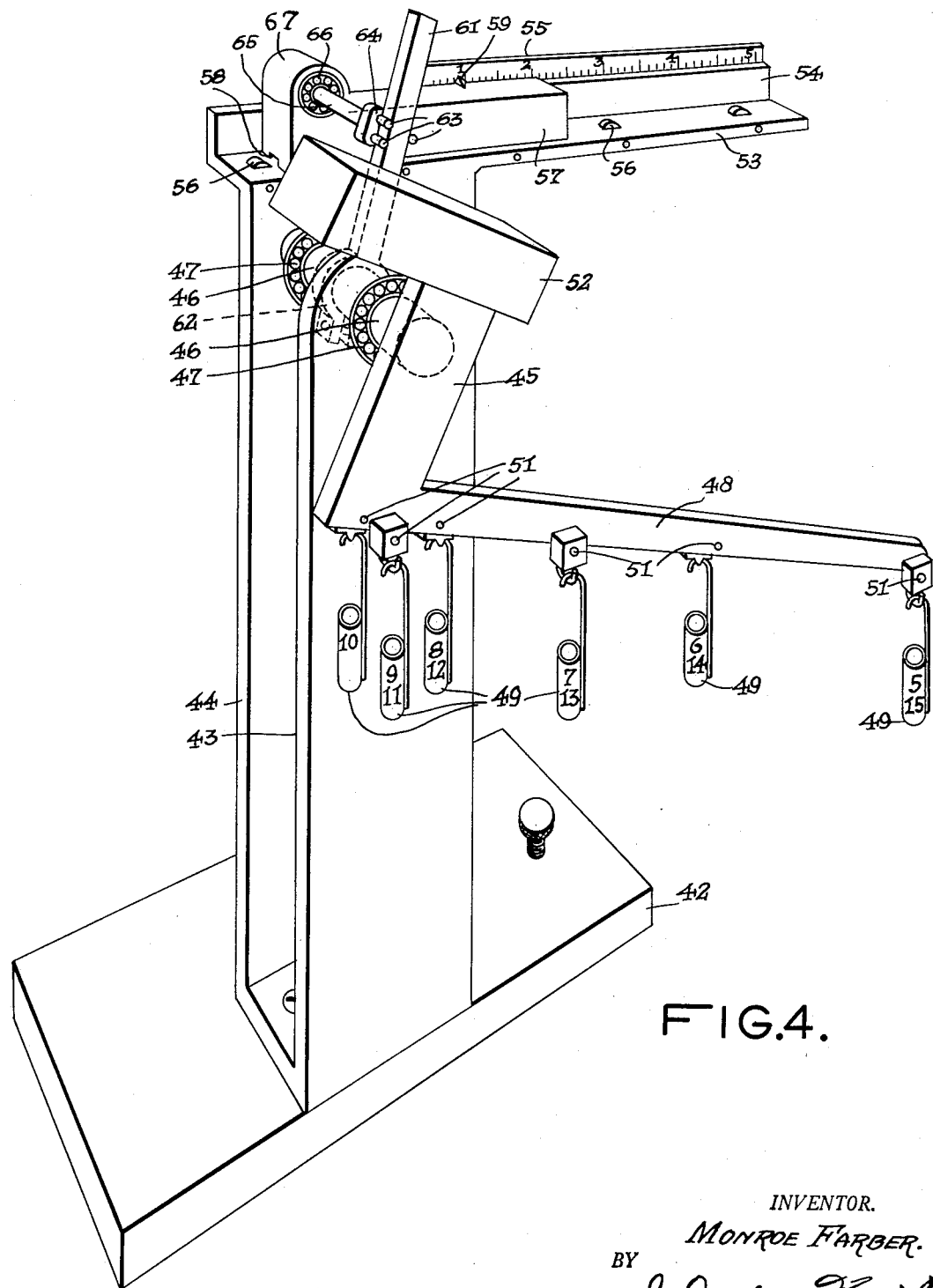
Figure 4 is a perspective schematic view of an instrument disclosing another embodiment of my invention.

The instrument illustrated in Figure 4 is a second moment analogue computer having a frame consisting of a broad base plate 42 to which are fixed two bearing supports 43 and 44 preferably made in an integral U-shaped piece. The supports carry a self balancing system which includes an arm 45 attached to shaft 46 mounted in bearings 47, recessed in the supports and free to rotate in the vertical plane. Shaft 46 serves as the fulcrum 0 and passes through the center of gravity of the system. To the arm is attached a beam 48 projecting from one side of arm 45. A plurality of weight pans 49 are swingingly supported on pivots 51 on beam 48, said pivots being distributed along a straight line. The points of distribution are arranged relative to a perpendicular line extending from the line of pivots 51 to fulcrum 0.

Figure 5:
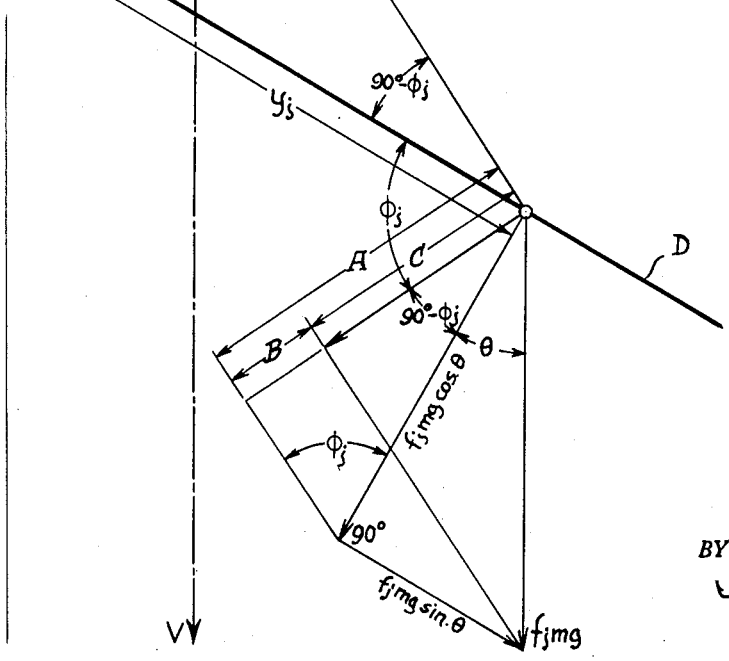
Figure 5 is an explanatory schematic diagram illustrating the mathematics of the device.

The point at which a line passing through the fulcrum perpendicularly intersects the line of the pivots represents $x_0$, where $x_0$ is the value of $x$ around whose ordinate the moment is to be taken. The distribution of pivots 51 from said intersection point is according to the formula, $K(x_j-x_0)^2$, where $x_j$ is the value to be represented by a particular pivot, and K is the scaling factor to convert the units $x$ into units of linear distance along the beam. The pivots or weight pans are marked with the values of $x_j$ and are alternated in this embodiment on front and back of the beam to prevent interferences between the weight pans. Also in this embodiment, the differences between successive $x_j$'s being equal and one value of $x_j$ being taken as $x_0$ and being represented by pan marked 10, the other weight pans represent two values, thereby reducing the number of pans required. The 90° point in Fig. 5 represents the juncture between arm 45 and arm 48 of Fig. 4. The 0 point on line D (Fig. 5) represents any selected one of pivots 51 (Fig. 4). In some applications it may not be possible to reduce the number of pans or pivots to this extent.

A counterbalancing weight 52 is affixed to the upper end of arm 45 to raise the center of gravity of the movable system into substantial coincidence with the axis of rotation.

A large number of small balls of equal mass are supplied as an element of the computer. These balls are placed in the weight pans to represent, by analogy, the distribution whose moment is to be determined.

The operation of the embodiment illustrated in Figure 4 is similar to the operation of the previously described embodiment.

On the top of the rear support 44 is a platform 53 having an upright bar 54 across the top of which is a graduated scale 55. A plurality of rollers 56 are provided in the floor of platform 53 over which indicator bar 57 moves. A recess 58 in the bottom of bar 57 accommodates rollers 56 which are spaced close enough together so that at least two rollers at a time engage said recess. Rollers 56 serve to keep the bar moving in a straight line as well as to keep the friction low so as to reduce any impediment against its movement.

Pointer 59 affixed to bar 57 indicates on scale 55 the value proportional to the tangent of the angle through which shaft 46 rotates. Scale 55 may be graduated so that the moment of the distribution of values represented by the weights or a function thereof is indicated.

Movement is imparted to bar 57 by means of a light linkage which comprises a lever arm 61 attached to shaft 46 by means of clamp 62. Arm 61 is engaged by means of roller bearing pins 63 on base 64 attached to shaft 65. Shaft 65 rotates in ball bearing 66 journalled in extension 67 on bar 57.

As shaft 46 rotates clockwise, arm 61 moves around the shaft in the same direction and bears upon roller pins 63 which ride out toward the end of the arm and which carry indicator bar 57 outward to the right along platform 53. Upon counterclockwise rotation of shaft 46, the reverse motions take place.

Arm 61 rotates through an angle equal to:

$$\theta = \arctan\left(\frac{K}{L}M_2'\right)$$

where L is the perpendicular distance from the line of the pivots 51 to the fulcrum.

In this manner the moment of distribution is easily and accurately indicated or is adapted for feeding successive analogue computers where information is derived from the distribution of the weights on beam 48 and transformed through the rotation of shaft 46.

Succeeding analogue computers may be adapted to compute the higher moments taken with reference to the mean of the distribution. Instead of using bar 57 and scale 55, with the associated linkage, there may be substituted a potentiometer connected to and operated by shaft 46, said potentiometer being nonlinear and having an output proportional to the tangent of the angle of rotation of shaft 46. Also the output of the potentiometer may be some function of the tangent of the angle through which shaft 46 rotates as required by the desired computations.

On the other hand, a linear potentiometer operated by a pinion rotated by a rack substituted for bar 57 may be utilized to obtain an output proportional to the moment. Also other suitable devices such as electromagnetic induction systems and photoelectric cell arrangements may be utilized for transforming the motion of shaft 46 into a function of the moment of distribution in a form suitable for further automatic computations.

A geometrical representation of the devices described herein and the forces due to the masses in any particular weight pan is illustrated in Figure 5. The angle $\theta$ represents the angle through which the pivot pin or shaft turns about the fulcrum 0, the angle being zero when the line of the pivots is horizontal. L is the shortest linear distance between the line of the pivots 32 or 51 and the fulcrum 0; $y_j$ is the linear distance between L and the pivot representing $x_j$; $\rho_j$ is the distance between the fulcrum and the pivot representing $x_j$; and $\phi_j$ is the corresponding angle between L and $\rho_j$. The trigonometrical relations are:

$$L = \rho_j \cos \phi_j, \quad y_j = \rho_j \sin \phi_j$$

As the number of masses in the pan is $f_j$, the total downward force at the pivot is $f_j mg$, where $m$ is the unit mass and $g$ is the gravitational acceleration. The components of the downward force along and perpendicular to the pivot line D are $f_j mg \sin \theta$ and $f_j mg \cos \theta$, respectively. The components perpendicular o the line $\rho_j$ are:

$$B = f_j mg \sin \theta \cos \phi_j, \quad A = f_j mg \cos \theta \sin \phi_j$$

and the total force perpendicular to $\rho_j$ is:

$$C = A - B = f_j mg (\sin \phi_j \cos \theta - \sin \theta \cos \phi_j)$$

The torque about the fulcrum is therefore:

$$T_j = \rho_j f_j mg (\sin \phi_j \cos \theta - \sin \theta \cos \phi_j)$$

or simplified:

$$T_j = mg f_j y_j \cos \theta - mg f_j L \sin \theta$$

The sum of all the torques due to the weights on all the pans is:

$$\sum_{j=1}^{n} T_j = \sum_{j=1}^{n} (mg f_j y_j \cos \theta - mg f_j L \sin \theta)$$

and the system will accelerate in the direction reducing the total torque to zero, and in equilibrium the system will be at rest so that:

$$\sum_{j=1}^{n} T_j = 0$$

or $$mg \sum_{j=1}^{n} (f_j y_j \cos \theta - f_j L \sin \theta) = 0$$

Factoring and rearranging:

$$\cos \theta \sum_{j=1}^{n} f_j y_j = L \sin \theta \sum_{j=1}^{n} f_j$$

which then leads to the result:

$$\tan \theta = \frac{1}{L} \frac{\sum_{j=1}^{n} f_j y_j}{\sum_{j=1}^{n} f_j}$$

and if $y_j$ is measured according to the formula $K(x_j - x_0)^k$, the angle $\theta$ will represent:

$$\arctan \frac{K}{L} M_k'$$

where $k$ is the order of the moment to be taken around $x_0$.

The advantage of using devices made according to the present invention which makes a conversion of the moment to the arctangent function lies in the fact that with extreme values of the moment the system does not run off to impossible extents. In other words as $M_K'$ approaches an infinitely large value, the angle of rotation of the movable part of the system will not exceed ninety degrees.

Another obvious advantage of the devices herein is that as soon as all masses representing values in the distribution have been added to the system, the devices automatically balance to give the simple arctangent function of the moment. It is also understood that any devices constructed in accordance with the principles of the invention will exhibit the same performance characteristics and will possess the same advantages.

The value $x$ may be in any useful units such as ohms of electrical impedance, thousandths of an inch linear measurement, pounds per square inch, etc. The conversion factor K and the distance L can be chosen on the basis of designing a suitable computer to fit the number $n$ of values of $x$ and the range of values of $x$ to be included.

By means of devices described herein it is possible to read directly on a scale, or to obtain a mechanical motion representing, the moment of a distribution with but the simple operation of adding weights to suitably marked pans, thus eliminating the labor of arithmetical calculations. Instruments of this character are particularly valuable in deriving moments from statistical data obtained from scientific experiment or industrial inspection.

Although the various weight pans in Figs. 2 and 4 are shown positioned in particular distributions along the respective beams, it is understood that my invention contemplates other distributions and configurations and other numbers of weight pans as are required by practice and usage implicit in different types of statistical and other similar problems and their solutions.

It is understood that modifications may be made in the design and arrangement of parts without departing from the spirit of the invention.

I claim:

A self-balancing system for determining moments of histogram type distributions comprising a beam, said beam being fulcrumed substantially at the center of gravity of the movable part of the system, said fulcrum being spaced apart from said beam, said beam moving angularly only relative to said fulcrum, means for suspending at least one of a number of bodies of equal mass from said beam, the points of suspension being arranged along a straight line on said beam, said line of points being perpendicular to a line from said fulcrum to said line of points, the rotation of said movable part of the system being a function of the distribution of said bodies, said points being disposed along said beam in accordance with the formula $$K(x_j - x_0)^k$$

where K is the scaling factor to convert the units of values into units of linear distance along the beam, $x$ is the algebraic quantity of any value, $j$ is the identity of the individual subdivisions of $x$, $x_j$ being the center of the subdivisions, $x_0$ is the value of $x$ around whose ordinate the moment is taken, and $k$ is a preselected constant.

References Cited in the file of this patent

UNITED STATES PATENTS

| | | |
|---|---|---|
| 119,871 | Marsh | Oct. 10, 1871 |
| 235,723 | Auchincloss | Dec. 21, 1880 |
| 958,192 | Tate et al. | May 17, 1910 |
| 2,391,243 | Hutton | Dec. 18, 1945 |
| 2,391,257 | McWhorter | Dec. 18, 1945 |
| 2,393,162 | Hayes | Jan. 15, 1946 |